Jan. 31, 1950
G. N. BUMSTEAD
2,495,887
COMPOSING FRAME AND EASEL FOR USE
IN PHOTOGRAPHIC REPRODUCTIONS
Filed Jan. 15, 1948
3 Sheets-Sheet 2
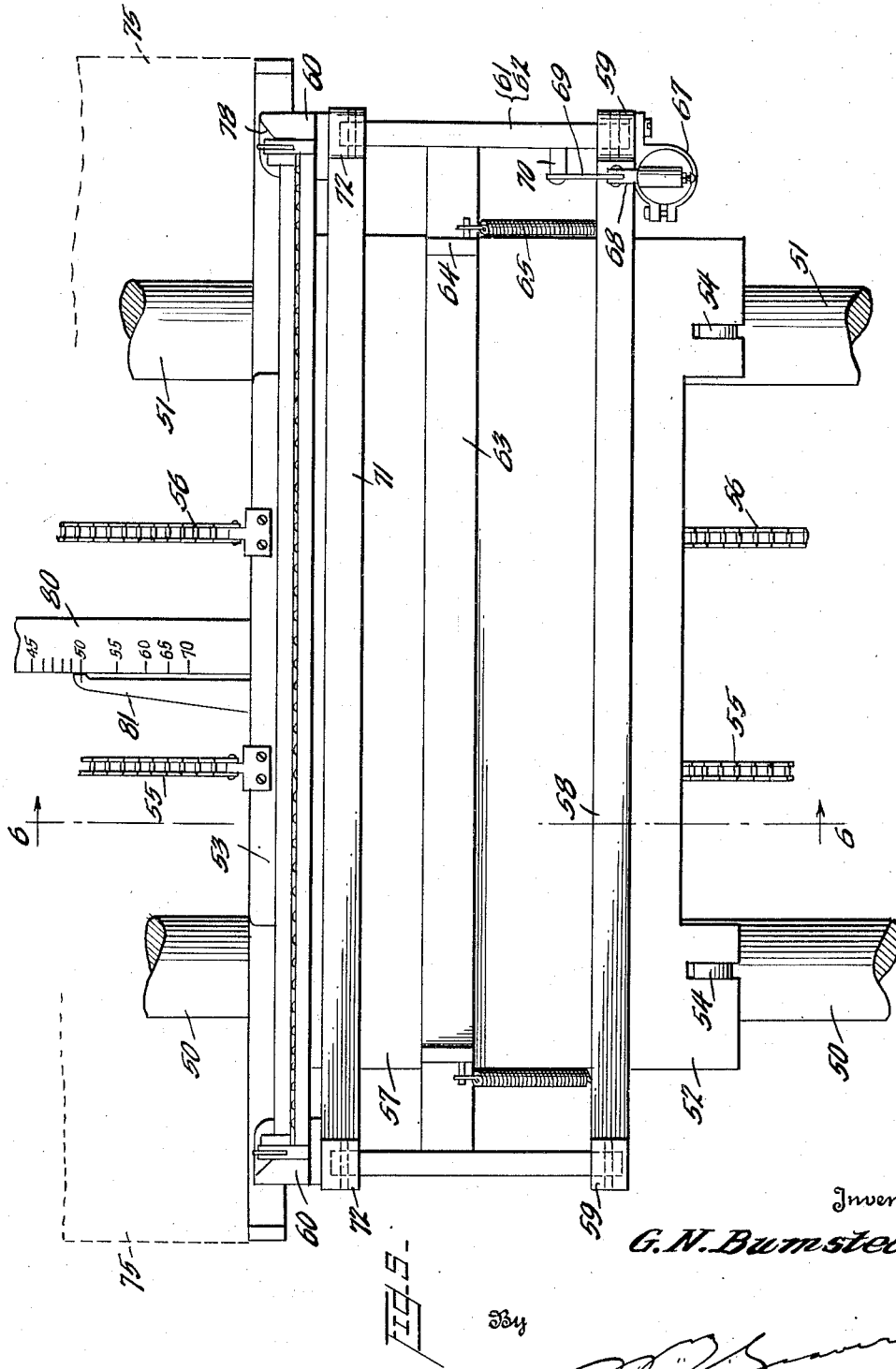
Inventor
G. N. Bumstead,
By
ATTORNEY Jan. 31, 1950     G. N. BUMSTEAD     2,495,887
COMPOSING FRAME AND EASEL FOR USE
IN PHOTOGRAPHIC REPRODUCTIONS
Filed Jan. 15, 1948     3 Sheets-Sheet 3
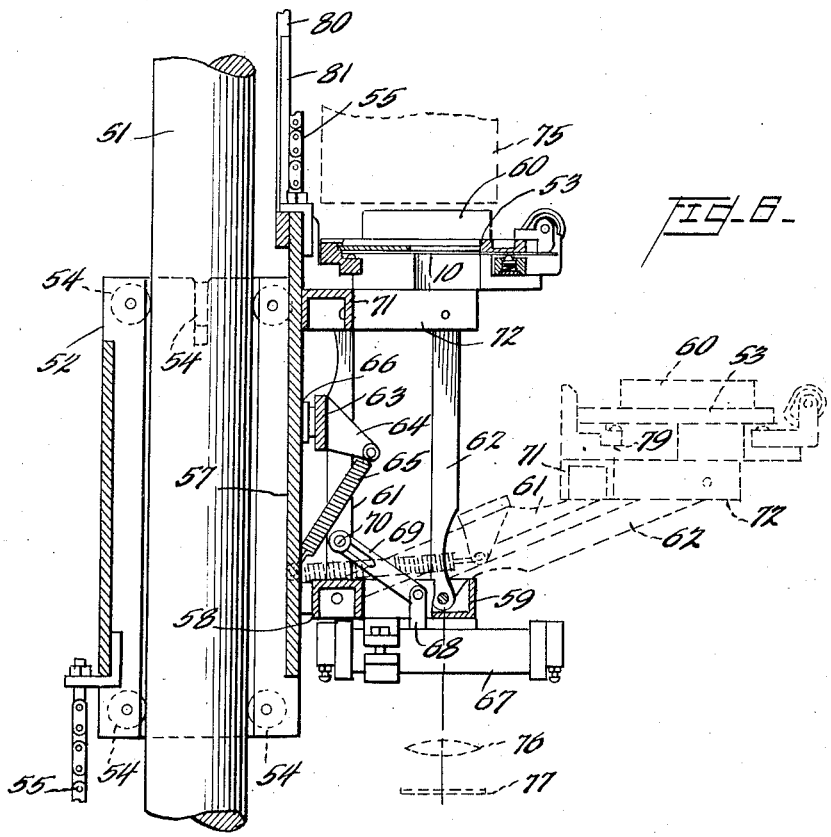
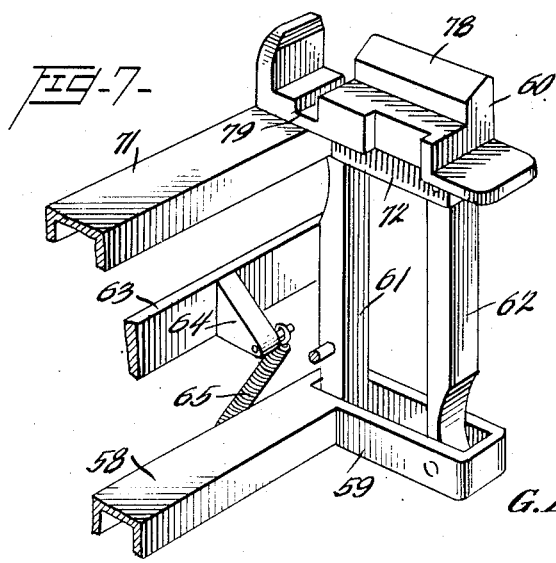
Inventor
G. N. Bumstead,
By
ATTORNEY Patented Jan. 31, 1950

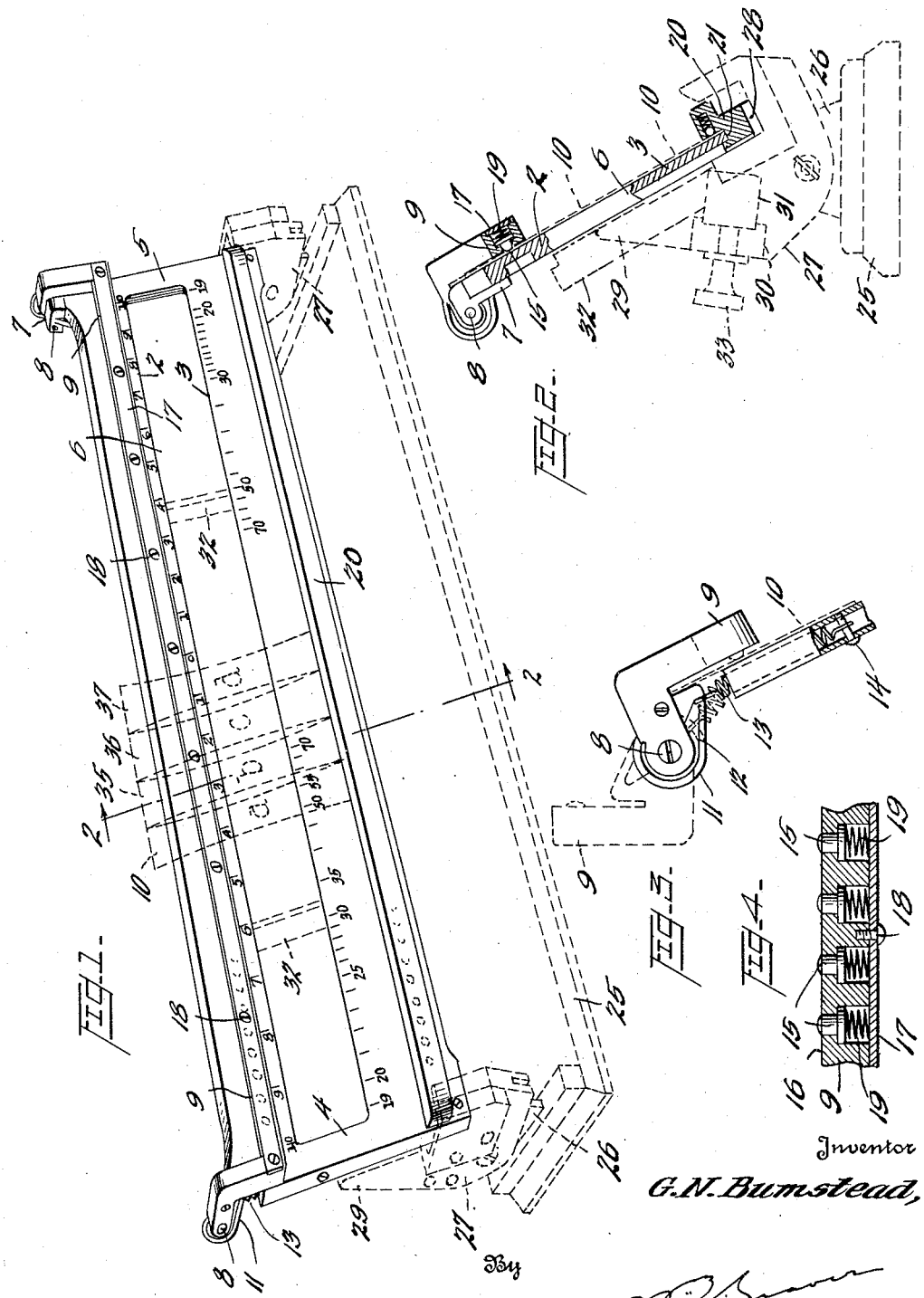

2,495,887

UNITED STATES PATENT OFFICE 2,495,887

COMPOSING FRAME AND EASEL FOR USE IN PHOTOGRAPHIC REPRODUCTIONS

George Newman Bumstead, Bethesda, Md., assignor to National Geographic Society, Washington, D. C., a corporation of the District of Columbia Application January 15, 1948, Serial No. 2,532

9 Claims. (Cl. 88—24)

1

This invention relates to the photographic reproduction of characters, and more specifically to a composing frame and its support, which frame is adapted to receive transparencies upon which characters are delineated and thereafter to be placed upon said support in a camera between a source of light and the sensitized medium upon which said characters are to be reproduced to the same or different scale as the originals.

The object of the invention is to provide a composing frame and a support therefor, which are simple in construction and more efficient in use than those heretofore proposed.

With these and other objects in view the invention resides in the novel details of construction and combinations of parts as will be disclosed more fully hereinafter and particularly covered by the claims.

Referring to the accompanying drawings forming a part of this specification and in which like numerals designate like parts in all the views, Fig. 1 is a perspective view of the composing frame made in accordance with this invention, said frame being shown resting upon an easel to facilitate the emplacement of transparencies in said frame;

Fig. 2 is a vertical transverse sectional view taken as on the line 2—2 of Fig. 1 and looking in the direction of the arrows;

Fig. 3 is an enlarged detail view partly in section of the hinged mounting of the upper pressure bar for holding transparencies in the frame;

Fig. 4 is an enlarged longitudinal sectional view of a portion of the upper pressure bar for holding transparencies in the frame under spring tension;

Fig. 5 is a front elevational view of a portion of the camera particularly illustrating the composing frame in its support on said camera;

Fig. 6 is a vertical sectional view of the parts shown in Fig. 5, taken as on the line 6—6 thereof and looking in the direction of the arrows; and Fig. 7 is a perspective view of one end of the support for the composing frame on the camera.

The composing frame comprises the members 2 and 3 respectively at the top and bottom thereof, and the members 4 and 5 respectively at the left and right ends thereof, all of said members being suitably interconnected and providing the light-transmitting opening 6 therebetween and across which opening the transparencies are placed, the top and bottom frame members having front faces lying in a common plane providing a seat for the applied transparency.

At each upper corner of said frame there is

2 secured a bracket 7 to which is pivotally secured as at 8 the upper pressure bar 9 swingable in one direction (downwardly) about said pivot to lie in close juxtaposed position relative the front face of said frame as clearly shown in Fig. 2, and swingable reversely (upwardly) to the dotted line position as shown in Fig. 3 for the purpose of making easier the application of a transparency such as 10 to the frame.

Any suitable means may be provided for holding the bar 9 under spring tension in its lowered position, one such means being shown in Fig. 3 as comprising a plate 11 movable with said bar and having formed therein a cam slot 12 receiving therein the upper end of a coil spring 13, the lower end of said spring being secured as by a pin 14 to said frame, the cam slot being fashioned as shown to increase the tension of said spring when said bar is raised, thereby insuring a quick downward movement being imparted to the bar when it is lowered upon the completion of the application of the transparencies to the frame, said spring being under sufficient tension when the bar is in its lowered position to hold said transparencies against slippage.

The upper pressure bar, as clearly illustrated in Fig. 4, is provided longitudinally thereof with a series of relatively closely spaced bores extending therethrough, each bore comprising two portions having different diameters, each bore containing a piston such as 15 the end of which is adapted to extend slightly beyond the plane of the rear surface 16 of said bar to contact yieldably one or more transparencies in the frame. Each piston is of T-shape in cross-section, the stem portion of which has sliding movement in that portion of the bore having the smaller diameter, and the head portion of which has sliding movement in that portion of the bore having the larger diameter. Both portions of said bore are substantially concentric, the head portion of said piston being retarded in one direction of its sliding movement by the shoulder created by the cutting tool forming the concentric bores, all as will be readily understood with reference to Fig. 4.

A cover plate 17 is secured to said bar as by screws 18, to cover all of the bores formed in said bar, and a coil spring 19 is disposed in the larger portion of each bore between said cover plate and the head of the contained piston, whereby said piston is under tension to force the projecting stem end thereof outwardly of said bar and against a transparency interposed between said bar and the face of the upper member 2 of the composing frame. The extreme stem end of each piston is slightly rounded to minimize damage to the transparencies.

The lower frame member 3 has rigidly secured thereto the lower pressure bar 20, also containing yieldable spring-tensioned members for contacting and holding the lower portions of the transparencies applied to the composing frame, said yieldable members preferably comprising a freely rotatable ball backed with a coil spring and housed in a bore extending into but not through said bar (see Fig. 2). As in the case of the upper pressure bar, these yieldable spring-pressed balls are arranged in a longitudinal series and relatively closely spaced to insure their contact with the transparencies.

This lower pressure bar is provided with a groove 21 of a certain width, for receiving therein the lower edge portion of the lower composing frame member 3, said lower edge portion being formed of a thickness less than the width of said groove, thereby providing a space between the front surface of said frame member and a side wall of said groove for the reception of the lower ends of the transparencies, as clearly indicated in Fig. 2. It thus results that a spring-pressed ball will hold a transparency against the face of the lower frame member 3. It is not necessary to provide this rigidly secured lower bar 20 with pistons, as was the case with the upper bar 9, because balls are selected having a diameter which is more than twice the width of the space provided for the lower ends of the transparencies, whereby it will be impossible for a ball to become dislodged from its retaining bore where there is no transparency for the ball to contact; in the case of the upper bar, it is necessary to provide headed pistons to prevent their dislodgment from their retaining bores when said bar is swung about its pivotal mounting.

Any suitable easel device may be provided for holding the composing frame when the transparencies are applied thereto, one such device being illustrated in Figs. 1 and 2 in dotted lines. Such device comprises a base 25 adapted to rest upon a table or desk and having at its opposite ends upstanding lugs 26 to each of which is pivotally secured an arm 27 having formed therein a groove 28 for receiving the lower edge portion of the composing frame. Each arm is upwardly extended as at 29 to provide a supporting back for said frame, the pivotal connection between said arm and said base being such as to make said arm angularly adjustable to provide desirable angularity of the face of the composing frame with respect to the operator who places the transparencies on said frame.

A bar 30 rigidly interconnects both arms 27, and slidable on said bar are two similar guide members 31, each having an upstanding blade 32 having a relatively thin front edge adapted to cooperate with scale markings provided on the face of the composing frame adjacent the opening 6 therein, said guides being adjustably secured in position on said bar, and with reference to said scale markings, as by a thumb-nut 33.

The scale markings on the upper frame member 2 are preferably in inches measured consecutively from a zero marking which is disposed at the median point of the frame opening 6. The scale markings on the lower frame member 3 are preferably in percentages of reduction (and/or magnification) desired in the reproduction of the transparency character or indicia on the sensitized medium in the camera, said percentages also being consecutively measured from the median point of the frame opening 6. Therefore it results that the transparencies may readily be applied to the composing frame so that the total width of the combined characters or other indicia on the selected transparencies may be accurately centered in the frame opening in accordance with either of the scale markings. The characters on the transparencies may be as desired, and one or more transparencies may be utilized in composing the matter which is to be photographically reproduced, the characters in Fig. 1 being indicated as letters, a letter to a transparency, whereby a plurality of transparencies may produce a word or name.

That is to say, there is shown a plurality of four transparencies 10, 35, 36 and 37 set up in the composing frame, said transparencies having respectively thereon the character letters a, b, c, and d, each transparency comprising a relatively narrow strip of transparent material so that light may be transmitted therethrough except at the areas defined by the opaque lines of said letters. Preferably the opposite vertical sides of each strip are curvilineally formed concavely so that the plurality of transparencies may be adjusted in a lateral direction to bring the plurality of letter characters into close juxtaposition with each other. This may possibly cause said transparencies to slightly overlap each other which is not detrimental since they are light-transmitting, and the yieldable holding members (upper pistons 15 and lower balls) will accommodate themselves to the thickness of the overlapped transparencies.

In applying the transparencies to the frame, the upper pressure bar 9 is swung upwardly out of the way, and then the individual transparencies are applied, pushing their lower ends down to the bottom of groove 21 to be yieldably held therein by the spring-pressed balls. The bottom edges of all transparencies are the same distance below the bottom line of their contained character whereby, when all of the desired characters are composed in the frame, there will result an aligned sequence of characters. With only the spring-pressed freely rotatable balls holding the transparencies, adjustment or justification in a lateral direction may be given the transparencies if found necessary. When the composition is completed, the upper pressure bar is swung downwardly so that its contained friction members (pistons) may contact the upper portions of the transparencies and add to the securement thereof in the frame.

Thus it is possible to set up or compose words or names of different lengths, and/or to compose a line of type in the composing frame, the overall length of the composition being justifiable by varying the spaces between the words thereof and/or the spaces between the letters of a word, the entire line of type or composition being correctly positioned in the frame by the use of the end guides such as 32 and either or both of the scale markings, all in accordance with the percentage or degree of photographic reduction (or magnification) desired in the reproduced line of type. All of said yieldable members hold the transparencies securely during the transfer of the composing frame from the easel to the camera.

It is obvious that the material of each transparency may be opaque, and that the characters may be transparent, instead of as described above, according to whether a negative or positive reproduction is desired.

Figs. 5, 6 and 7 illustrate the composing frame in association with its support in a camera. Two vertical parallel circularly formed tracks 50 and 51 extend upwardly from a suitable base (not shown), and upon these tracks is mounted a carriage generally identified by the numeral 52 for supporting the composing frame (in these views generally identified by the numeral 53). Said carriage is provided with a plurality of rollers such as 54 positioned to operate in longitudinal planes of each track to provide unwavering substantially frictionless travel of the carriage. Identical chains indicated at 55 and 56, and having their ends secured to said carriage and passing over identical upper and identical lower sprockets (not shown) and driven in any suitable manner, are provided for causing upward or downward movement of said carriage on said tracks.

The carriage is provided with a vertical front plate 57 carrying a horizontally disposed crossbar 58 the opposite ends of which have identical horizontal forward extensions such as 59 (see Fig. 7) for pivotally supporting a cradle or saddle generally identified by the numeral 60 in which the composing frame is seated. Said saddle is pivotally connected by a pair of parallel links 61 and 62 to each forward extension 59 to maintain said saddle (and the contained composing frame 53) always in horizontal position due to the fact that the pair of upper pivots as well as the pair of lower pivots for said links are disposed in horizontal planes; that is to say, the entire saddle structure mounting comprises a parallel linkage.

The two rearmost links of this mounting are interconnected by a bar 63 having a forwardly extending lug 64 to which is secured one end of a coil spring 65 the other end of which is connected to the front plate 57 of the carriage at such a point that, when the saddle is pivotally moved from its uppermost position (shown in full lines in Fig. 6) to its lower position (shown in dotted lines), the tension of said spring will be increased and consequently said saddle will have a decided urge to return to its upper position. Any suitable means may be provided for holding the saddle structure in its lowered position (such for example as a spring-pressed ball carried by the saddle and engageable with a socket formed in a stationary portion of the carriage). A projection 66 on the front plate of the carriage constitutes an abutment for the bar 63 to limit the upward movement and ultimate position of the saddle.

To prevent damaging shock when bar 63 contacts abutment 66, there is provided a dashpot 67 or other cushioning or slowing device whose movable member or piston 68 is connected by a slotted link 69 to the saddle link 61, the slot in link 69 permitting rapid initial upward return movement of the saddle (by virtue of the spring 65) which is later slowed by the action of the dash pot when the saddle link pin 70 reaches the end of said slot and actuates said piston. For additional rigidity of the saddle structure there may be provided a second cross bar 71 having its opposite ends forwardly and identically extended as indicated at 72 and carrying the pivots for the upper extremities of the links 61 and 62, said cross bar being a substantial duplicate of the lower crossbar 58.

The mounting of said saddle is such that, when in its uppermost position, the opening in the composing frame (and consequently the transparency-carried character) will be positioned closely under a box 75 carried by the carriage and containing a source of light the rays of which may pass downwardly through the transparency and be collected by a focusable lens (indicated in dotted lines at 76) whereby said character may be reproduced on a sensitized medium (indicated in dotted lines at 77 and disposed in a fixed plane) below said lens in the desired degree of reproduction, said degree being determined and controlled by the distance of said lens from said transparency as well as from said medium. The upper extremity of each of the opposite ends of the saddle structure are suitably formed to receive, guide and/or position the composing frame so that it will be centered on said carriage, in the drawings there being shown a bevelled surface such as 78 for guiding said frame into its correct longitudinal position, and a groove 79 to receive therein the forward extension of the lower pressure bar 20 for locking said frame in its correct transverse position and thereby preventing any lateral displacement of the frame in said saddle. The saddle is pivotally mounted so that it can be swung forwardly and downwardly, from its position under the light box 75, to a position such that the composing frame can readily be inserted and withdrawn.

The rigid frame of the camera is provided with a depending scale 80, and said carriage is provided with a pointer 81, said scale having markings thereon which are indicative of percentages of reduction (and/or magnification) desired, said markings being registrable with the end of said pointer, whereby the operator of the camera may raise or lower said carriage (as well as the lens 76) to obtain a position thereof which will result in the reproduction of the transparency-carried character in accordance with the degree of reduction (or enlargement) indicated by such registration.

From the foregoing description it will be understood that by this invention there is provided a camera having a vertically disposed track upon which a carriage is mounted for movement, said carriage having a cradle or saddle pivotally supported under spring tension thereon and providing a seat for receiving a composing frame within which is located the object (indicia) to be photographically reproduced, said saddle provided with means for centering said frame with respect thereto. Said camera is further provided with a support for a sensitized medium (film) below said carriage, said support being such as to maintain said medium in a fixed horizontal plane, and a lens disposed between said carriage and said medium, said lens and said carriage being mounted for adjustment relative said medium in accordance with the degree of reproduction of the object desired on said medium. In addition there is provided a retarding means in the nature of a dashpot for slowing the pivotal movement in one direction of the saddle with respect to said carriage, whereby a shock is prevented when the saddle moves upwardly into contact with said carriage, which shock if not prevented might dislodge and/or throw out of proper alignment the indicia contained in the composing frame for reproduction purposes.

More specifically the invention comprises a composing frame having structural features as fully disclosed in the foregoing, as well as an easel for supporting said frame during the setting up thereon of the object to be reproduced, said easel having a pair of adjustably mounted guides cooperating with scale markings on the frame to establish a readily visible area of limitation within which one or more objects (transparencies) are to be placed or composed for the degree of reproduction desired.

It is obvious that those skilled in the art may vary the details of construction and combinations of parts without departing from the spirit of this invention, wherefore it is desired not to be limited to the exact foregoing disclosure except as may be required by the claims.

What is claimed is:

1. A composing frame for holding one or more transparencies on each of which is depicted a character which is to be reproduced photographically, said frame having top and bottom members as well as end members providing an unobstructed opening therebetween through which light rays may pass, the bottom member provided with a groove for receiving the lower edge portion of a transparency, said bottom member further provided with a plurality of relatively closely spaced yieldable friction members so mounted as to extend into said groove for engaging and frictionally holding the lower edge portion of an inserted transparency, the top member provided with a bar having relative movement therewith, said bar having a plurality of relatively closely spaced yieldable friction members so mounted as to protrude from a face of said bar for frictionally engaging the upper edge portion of an inserted transparency when said bar is moved to bring said face thereof into cooperating relation with the transparency.

2. A composing frame for holding one or more transparencies on each of which is depicted a character which is to be reproduced photographically, said frame having top and bottom members as well as end members providing an unobstructed opening therebetween through which light rays may pass, the bottom member provided with a groove for receiving the lower edge portion of a transparency, said bottom member further provided with a plurality of relatively closely spaced spring-tensioned friction members so mounted as to extend into said groove for engaging and frictionally holding the lower edge portion of an inserted transparency, the top member provided with a bar having relative movement therewith, said bar having a plurality of relatively closely spaced spring-tensioned friction members so mounted as to protrude from a face of said bar for frictionally engaging the upper edge portion of an inserted transparency when said bar is moved to bring said face thereof into cooperative relation with the transparency.

3. A composing frame for holding one or more transparencies on each of which is depicted a character which is to be reproduced photographically, said frame having top and bottom members as well as end members providing an unobstructed opening therebetween through which light rays may pass, the bottom member provided with a groove for receiving the lower edge portion of a transparency, said bottom member further provided with a plurality of relatively closely spaced spring-pressed balls constituting friction members so mounted as to extend into said groove for engaging and frictionally holding the lower edge portion of an inserted transparency, the top member provided with a bar having relative movement therewith, said bar having a plurality of relatively closely spaced spring-pressed pistons constituting friction members so mounted as to protrude from a face of said bar for frictionally engaging the upper edge portion of an inserted transparency when said bar is moved to bring said face thereof into cooperating relation with the transparency.

4. A composing frame for holding one or more transparencies on each of which is depicted a character which is to be reproduced photographically, said frame having top and bottom members as well as end members providing an unobstructed opening therebetween through which light rays may pass, the bottom member provided with a groove for receiving the lower edge portion of a transparency, said bottom member further provided with a plurality of relatively closely spaced yieldable friction members so mounted as to extend into said groove for engaging and frictionally holding the lower edge portion of an inserted transparency, the top member provided with a bar having relative movement therewith, said bar having a plurality of relatively closely spaced yieldable friction members so mounted as to protrude from a face of said bar for frictionally engaging the upper edge portion of an inserted transparency when said bar is moved to bring said face thereof into cooperating relation with the transparency, and means for holding said bar under tension when moved into said cooperating relation.

5. A composing frame for holding one or more transparencies on each of which is depicted a character which is to be reproduced photographically, said frame having top and bottom members as well as end members providing an unobstructed opening therebetween through which light rays may pass, the bottom member provided with a groove for receiving the lower edge portion of a transparency, said bottom member further provided with a plurality of relatively closely spaced yieldable friction members so mounted as to extend into said groove for engaging and frictionally holding the lower edge portion of an inserted transparency, the top member provided with a bar having relatively movement therewith, said bar having a plurality of relatively closely spaced yieldable friction members so mounted as to protrude from a face of said bar for frictionally engaging the upper edge portion of an inserted transparency when said bar is moved to bring said face thereof into cooperating relation with the transparency, and means for holding said bar under tension when moved into said cooperating relation, said means comprising a spring secured at one end to said frame, the other end of said spring engaging a cam slot carried by said bar.

6. A composing frame for holding one or more transparencies on each of which is depicted a character which is to be reproduced photographically, and an easel for supporting said frame during the composing of the transparencies thereon, said frame having top and bottom members as well as end members providing an unobstructed opening therebetween through which light rays may pass, the bottom member provided with a groove for receiving the lower edge portion of a transparency, said bottom member further provided with a plurality of relatively closely spaced yieldable friction members so mounted as to extend into said groove for engaging and frictionally holding the lower edge portion of an inserted transparency, the top member provided with a bar having relative movement therewith, said bar having a plurality of relatively closely spaced yieldable friction members so mounted as to protrude from a face of said bar for frictionally engaging the upper edge portion of an inserted transparency when said bar is moved to bring said face thereof into cooperating relation with the transparency, said top member provided with scale markings adjacent the frame opening, said markings measured in opposite directions from the median point of the opening, said easel provided with a pair of adjustably mounted guides cooperating with said markings to establish a readily visible area of limitation within which the transparencies are to be composed on said frame.

7. A composing frame for holding one or more transparencies on each of which is depicted a character which is to be reproduced photographically, and an easel for supporting said frame during the composing of the transparencies thereon, said frame having top and bottom members as well as end members providing an unobstructed opening therebetween through which light rays may pass, the bottom member provided with a groove for receiving the lower edge portion of a transparency, said bottom member further provided with a plurality of relatively closely spaced yieldable friction members so mounted as to extend into said groove for engaging and frictionally holding the lower edge portion of an inserted transparency, the top member provided with a bar having relative movement therewith, said bar having a plurality of relatively closely spaced yieldable friction members so mounted as to protrude from a face of said bar for frictionally engaging the upper edge portion of an inserted transparency when said bar is moved to bring said face thereof into cooperating relation with the transparency, said top and bottom members each provided with scale markings adjacent the frame opening, said markings measured in opposite directions from the median point of the opening, the markings on one of said members being indicative of the degree of reduction desired in the reproduction of the transparency-carried character, said easel provided with a pair of adjustably mounted guides cooperating with said markings to establish a readily visible area of limitation within which the transparencies are to be composed on said frame in accordance with the degree of reduction desired.

8. In a photographic reproduction apparatus wherein a path of light is established between a light source and a photosensitized film, and wherein a composing frame containing transparent indicia is movable into and out of the established light path for obtaining reproductions on the film of the contained indicia, the combination of a source of light; a carriage movable toward and away from the film; a saddle for receiving the composing frame; means pivotally mounting said saddle under spring tension on said carriage, said means comprising parallel linkage for maintaining the composing frame in planes at right angles to the axis of the light path; and retarding means for slowing the pivotal movement in one direction of said saddle with respect to said carriage.

9. In a photographic reproduction apparatus wherein a path of light is established between a light source and a photosensitized film, and wherein a composing frame containing transparent indicia is movable into and out of the established light path for obtaining reproductions on the film of the contained indicia, the combination of a source of light; a carriage movable toward and away from the film; a saddle for receiving the composing frame; means pivotally mounting said saddle under spring tension on said carriage, said means comprising parallel linkage for maintaining the composing frame in planes at right angles to the axis of the light path; and retarding means comprising a dash pot for slowing the pivotal movement in one direction of said saddle with respect to said carriage.

GEORGE NEWMAN BUMSTEAD.

REFERENCES CITED

The following references are of record in the file of this patent:

UNITED STATES PATENTS

| Number | Name | Date |
| --- | --- | --- |
| 2,003,190 | Hineline | May 28, 1935 |
| 2,334,541 | Bumstead | Nov. 16, 1943 |
| 2,346,217 | Heybourne | Apr. 11, 1944 |

FOREIGN PATENTS

| Number | Country | Date |
| --- | --- | --- |
| 346,754 | Great Britain | Apr. 10, 1931 |